US012801267B2

(12) United States Patent
Gong et al.

(10) Patent No.: US 12,801,267 B2
(45) Date of Patent: Nov. 17, 2026

(54) INTERACTIVE COLLABORATING REHEARSAL SYSTEM

(71) Applicant: BOE TECHNOLOGY GROUP CO., LTD., Beijing (CN)

(72) Inventors: Fangyuan Gong, Beijing (CN); Youxiang Xia, Beijing (CN); Enhui Guan, Beijing (CN); Feng Zhang, Beijing (CN); Zhongkui Wan, Beijing (CN); Xianzhen Li, Beijing (CN); Zhimao Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 123 days.

(21) Appl. No.: 18/293,830

(22) PCT Filed: Jul. 26, 2022

(86) PCT No.: PCT/CN2022/107990

§ 371 (c)(1),
(2) Date: Jan. 31, 2024

(87) PCT Pub. No.: WO2024/020794

PCT Pub. Date: Feb. 1, 2024

(65) Prior Publication Data

US 2024/0338113 A1 Oct. 10, 2024

(51) Int. Cl.
*G06V 20/40* (2022.01)
*G06F 3/04845* (2022.01)
(Continued)

(52) U.S. Cl.
CPC ............ *G06F 3/04845* (2013.01); *G06F 3/14* (2013.01); *G06T 3/40* (2013.01); *G06T 5/50* (2013.01);
(Continued)

(58) Field of Classification Search
CPC ......... G06F 3/04845; G06F 3/14; G06T 7/70; G06T 5/73; G06T 5/70; G06T 5/50; G06T 3/40; G06T 2207/20221
See application file for complete search history.

(56) References Cited

U.S. PATENT DOCUMENTS 10,122,797 B2 * 11/2018 Feng ...................... H05B 45/30
10,924,691 B2 * 2/2021 Suzuki .................. H04N 7/181
(Continued)

FOREIGN PATENT DOCUMENTS

CN 108255304 A 7/2018
CN 111163343 A 5/2020
(Continued)

*Primary Examiner* — Cheng Yuan Tseng
(74) *Attorney, Agent, or Firm* — HOUTTEMAN LAW LLC

(57) ABSTRACT

An interactive system includes a terminal, a display screen and a server, the server determines a current position of a target object on the display screen; generates an object identifier of the target object according to the current position thereof, and associates the object identifier with the current position; receives adjustment information of the target object, generates an indication pattern according to the current position and the adjustment information, and transmits the indication pattern to the display screen; the terminal displays a frame image configured for the display screen, displays the object identifier according to an association relationship between the object identifier and the current position; generates adjustment information of the target object in response to an arrangement operation of a user on the object identifier; the display screen displays the indication pattern to instruct the target object to adjust according to an indication of the indication pattern.

17 Claims, 3 Drawing Sheets

(51) Int. Cl.

| | |
|---|---|
| ***G06F 3/14*** | (2006.01) |
| ***G06T 3/40*** | (2006.01) |
| ***G06T 5/50*** | (2006.01) |
| ***G06T 5/70*** | (2024.01) |
| ***G06T 5/73*** | (2024.01) |
| ***G06T 7/70*** | (2017.01) |

(52) U.S. Cl.

CPC .................. *G06T 5/70* (2024.01); *G06T 5/73* (2024.01); *G06T 7/70* (2017.01); *G06T 2207/20221* (2013.01)

(56) References Cited

U.S. PATENT DOCUMENTS

| | | | | |
|---|---|---|---|---|
| 10,944,999 | B2 * | 3/2021 | Nicol | H04N 21/242 |
| 11,393,103 | B2 * | 7/2022 | Gu | G06T 7/246 |
| 11,445,102 | B2 * | 9/2022 | Nakatsuka | H04N 23/633 |
| 11,494,067 | B2 * | 11/2022 | Matsubayashi | H04N 13/167 |
| 11,902,692 | B2 * | 2/2024 | Emori | G06V 20/48 |
| 12,051,341 | B2 * | 7/2024 | Leahy | G09B 9/30 |
| 12,370,689 | B2 * | 7/2025 | Izumihara | G06T 7/20 |
| 2015/0177711 | A1 * | 6/2015 | Yuzurihara | H04L 12/2829 700/56 |
| 2021/0065384 | A1 * | 3/2021 | Sun | G06T 7/277 |
| 2021/0392462 | A1 * | 12/2021 | Feeney | F21V 14/04 |
| 2023/0362315 | A1 * | 11/2023 | Saito | H04N 21/2187 |
| 2024/0219509 | A1 * | 7/2024 | Izumihara | G05D 1/2297 |
| 2024/0314454 | A1 * | 9/2024 | Nakai | H04N 23/90 |

FOREIGN PATENT DOCUMENTS

| | | | |
|---|---|---|---|
| CN | 111210577 | A | 5/2020 |
| CN | 108363603 | B | 4/2022 |
| CN | 114637890 | A | 6/2022 |
| JP | 2000149045 | A | 5/2000 |

* cited by examiner

INTERACTIVE COLLABORATING REHEARSAL SYSTEM

TECHNICAL FIELD

The present disclosure relates to the field of display technology, and particularly relates to an interactive system.

BACKGROUND

At present, the application of the display screen technology in large-scale performance is more and more common, and pictures displayed by the display screen are matched with the performance content of actors to present a stunning program effect. The display screen has incomparable advantages during presenting the program effect, but a real-time communication between a commander and the actors and an adjustment on the stage effect are time-consuming and labor-consuming works during the rehearsal, for example, the communication between the commander and different actors is repeated, and coordination and cooperation of a large number of people are required. In addition, during the performance, if the commander is to perform the adjustment on the stage effect, a communication with post production personnel is desired generally first, and after the post production personnel makes a modification, an adjusted picture can be presented on the display screen, and thus a large amount of manpower, material resources and time cost are required in the process, seriously affecting the efficiency of program rehearsal.

SUMMARY

The present disclosure is directed to solving at least one of the technical problems of the prior art and provides an interactive system.

In a first aspect, an embodiment of the present disclosure provides an interactive system, which includes a terminal, a display screen, and a server; the terminal and the display screen each being communicatively connected with the server, where the server is configured to determine a current position of a target object on the display screen; generate an object identifier of the target object according to the current position of the target object, and associate the object identifier of the target object with the current position of the target object; receive adjustment information of the target object, generate an indication pattern according to the current position and the adjustment information of the target object, and transmit the indication pattern to the display screen for display; the terminal is configured to display a frame image configured in advance for the display screen, and display the object identifier of the target object according to an association relationship between the object identifier and the current position of the target object; and generate adjustment information of the target object in response to an arrangement operation of a user on the object identifier; and the display screen is configured to display the indication pattern to instruct the target object to adjust according to an indication of the indication pattern.

In some examples, the server includes a position determinating module, an identifier generating module, an information associating module, a pattern generating module, and a pattern transmitting module, where the position determinating module is configured to determine the current position of the target object on the display screen; the identifier generating module is configured to generate the object identifier of the target object; the information associating module is configured to associate the object identifier and the current position of each target object; the pattern generating module is configured to receive the adjustment information, generate the indication pattern according to the current position and the adjustment information of the target object, and transmit the indication pattern to the display screen for display; and the pattern transmitting module is configured to transmit the indication pattern to the display screen for display.

In some examples, the position determinating module is further configured to receive a scene image of a real scene, identify the target object in the scene image, and determine the current position of the target object.

In some examples, the interactive system further includes a sensor configured for the target object, the sensor being configured to transmit position information of the target object to the server, where the position determining module is further configured to take the received position information of the target object as the current position of the target object.

In some examples, the adjustment information includes an updated position of the target object; the pattern generating module is further configured to generate, according to the current position and the updated position of the target object, a first indication pattern located at the current position and a second indication pattern from the current position to the updated position of the target object; and the display screen is further configured to display the first indication pattern at the current position and display the second indication pattern between the current position and the updated position of the target object.

In some examples, the pattern generating module is further configured to: determine, from the frame image, a picture corresponding to another area around the current position of the target object and an area picture between the current position and the updated position of the target object; generate the first indication pattern located at the current position of the target object according to the picture corresponding to the another area around the current position of the target object; and generate the second indication pattern from the current position of the target object to the updated position of the target object according to the area picture, the current position and the updated position of the target object.

In some examples, the pattern transmitting module is further configured to transmit the frame image to the display screen; the display screen is further configured to display the frame image and to display, after receiving the indication pattern, the indication pattern by superimposing the indication pattern on the frame image; or replacing the frame image at the current position of the target object with the first indication pattern, and display the second indication pattern by superimposing the second indication pattern on the frame image.

In some examples, the adjustment information includes an updated position of the target object, and the pattern generating module is further configured to: generate a third indication pattern located at the current position of the target object according to the current position of the target object; and generate a fourth indication pattern located at the updated position according to the updated position of the target object; and the display screen is further configured to display the third indication pattern at the current position and display the fourth indication pattern at the updated position.

In some examples, the interactive system further includes a storage module, where the terminal is further configured to transmit, in response to a scheme storage operation, a position of each object identifier currently displayed to the storage module, and the storage module is configured to store the position of each object identifier.

In some examples, the terminal further includes a display module and a replacement module; where the display module is configured to display, in response to a replacement operation on the frame image, the frame image and a preset material library file; the material library file includes at least one material video for replacing the frame image; the replacement module is configured to select, in response to a selection of a starting time point and an ending time point and a selection operation on the material video, a target material video section from the material video to replace the frame image between the starting time point and the ending time point, a duration of the target material video section is equal to a time duration from the starting time point to the ending time point.

In some examples, the terminal further includes a selecting module, the selecting module including a first adjusting unit and an enlarging unit; the first adjusting unit is configured to adjust a partial region of the frame image into a regular region in response to an operation of selecting the partial region; the enlarging unit is configured to enlarge a sub-image located in the regular region; the replacing module is further configured to: select, in response to the selection of the starting time point and the ending time point and the selection operation on the material video, the target material video section located at a corresponding position in the regular region from the material video to replace the sub-image, located in the regular region and between the starting time point and the ending time point, of each frame image, a resolution of a material image in the target material video section being the same as a resolution of the frame image.

In some examples, the selecting module further includes a second adjusting unit; the second adjusting unit is configured to determine a target region in response to an adjustment on the regular region; the enlarging unit is further configured to enlarge a sub-image located in the target region; the replacing module is further configured to: select, in response to the selection of the starting time point and the ending time point and the selection operation on the material video, a target material video section located at a corresponding position in the target region from the material video to replace the sub-image, located in the target area and between the starting time point and the ending time point, of each frame image.

In some examples, the terminal further includes a boundary optimization module; the boundary optimization module is configured to determine, after the replacing module completes its operation, in response to an optimization operation on a boundary of the replaced image, an image, with the optimized boundary, to be presented, the optimization operation including one or more of color smoothing, boundary sharpening or image blurring; the display screen is further configured to display the image to be presented.

In some examples, the terminal further includes a manual adjustment module, the manual adjusting module including an editing unit and a display unit; the editing unit is configured to generate an edited content in response to an editing operation on the frame image; the display unit is further configured to display the edited content by superimposing the edited content on the frame image; the display screen is further configured to display the frame image on which the edited content is superimposed.

In some examples, the manual adjustment module further includes an effect adjusting unit; the effect adjusting unit is configured to adjust a playback effect of the edited content; the display unit is further configured to display the edited content and the playback effect by superimposing them on the frame picture; and the display screen is configured to display the frame image on which the edited content and the adjusted playback effect are superimposed.

In some examples, the interactive system further includes an image capturing device, where the image capturing device is configured to capture a scene image of a real scene and transmit the scene image to the server.

DETAIL DESCRIPTION OF EMBODIMENTS

Figure 1:
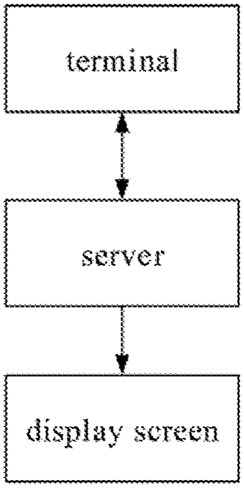
FIG. 1 is a schematic diagram of an interactive system according to an embodiment of the present disclosure.

To make the objects, technical solutions and advantages of embodiments of the present disclosure more apparent, the technical solutions in the embodiments of the present disclosure will be described clearly and completely with reference to the drawings in the embodiments of the present disclosure, and it is obvious that the described embodiments are only a part of the embodiments of the present disclosure, not all of the embodiments. Components of the embodiments of the present disclosure, as generally described and illustrated in the drawings herein, could be arranged and designed in a wide variety of different configurations. Thus, the following detailed description of the embodiments of the present disclosure, provided by referring to the accompanying drawings, is not intended to limit the protective scope of the present disclosure, but is merely representative of selected embodiments of the present disclosure. All other embodiments, which can be derived by a person skilled in the art from the embodiments of the present disclosure without any creative effort, shall fall within the protective scope of the present disclosure.

Unless defined otherwise, technical or scientific terms used herein shall have the ordinary meaning as understood by one of ordinary skill in the art to which the present disclosure belongs. The terms "first", "second", and the like in this disclosure are not intended to indicate any order, quantity, or importance, but rather are used to distinguish one element from another. Also, the term "a", "an", "the", or the like does not denote a limitation of quantity, but rather denotes the presence of at least one. The term "comprising/including", "comprises/includes", or the like means that the element or item preceding the term includes the element or item listed after the term and its equivalent, but does not exclude other elements or items. The term "connected/coupled", "connecting/coupling", or the like is not restricted to physical or mechanical connections, but may include electrical connections, whether direct or indirect. The terms "upper/on/above", "lower/under/below", "left", "right", and the like are used only to indicate relative positional relationships, and when the absolute position of the object being described is changed, the relative positional relationships may also be changed accordingly.

The term "a plurality of" or "a number of" in the present disclosure means two or more. The term "and/or" describes an association relationship of the associated objects, indicating that there may be three relationships, for example, A and/or B may indicate that: A exists alone, A and B exist simultaneously, and B exists alone. The character "/" generally indicates that the former one and the latter one of the associated objects are in an "or" relationship.

In a first aspect, FIG. 1 is a schematic diagram of an interactive system according to an embodiment of the present disclosure, and as shown in FIG. 1, the interactive system includes a terminal, a display screen, and a server, the terminal and the display screen both are communicatively connected with the server. Here, the display screen may be a stage screen in a performance scene, and includes a display screen located on the ground, a display screen on surrounding walls, a display screen on a ceiling, a display screen suspended in the air, and the like.

Structures in the interactive system will be described in detail below.

The server is configured to determine a current position of a target object positioned on the display screen; generate an object identifier of the target object according to the current position of the target object, and associate the object identifier of the target object with the current position of the target object; and receive adjustment information of the target object, generate an indication pattern according to the current position of the target object and the adjustment information, and transmit the indication pattern to the display screen for displaying.

Here, the target object may be a person or an object to be controlled, for example, in a stage rehearsal scene, the target object may be an actor, a prop, or the like. The object identifier may be a virtual model, an avatar, a symbol, and the like that is used to present the target object.

In the stage rehearsal scene, the actor stands on the display screen, the prop is arranged around the actor, and the server can determine a specific position of the target object on the display screen in a stage scene (i.e., the current position of the target object on display screen) through information acquired by a scene camera or a position sensor. A corresponding object identifier is generated for each target object to be controlled, the object identifier and the current position of the target object are associated with each other, and such an association relationship is stored for the terminal subsequently monitoring the position of the target object.

Since the current position represents a current position of the target object in a real scene, the adjustment information includes position adjustment information for adjusting the position of the target object. The server generates an indication pattern, indicating that the target object is moved from the current position, according to the current position and the position adjustment information of the target object, and in response to that the indication pattern is displayed on the display screen, the target object in the real scene can adjust the position thereof according to an indication of the indication pattern.

The terminal is configured to display a frame image configured in advance for the display screen and display the object identifier according to the association relationship between the object identifier and the current position; and generate the adjustment information of the target object in response to an arrangement operation of an operator on the object identifier.

Here, the operator operates the terminal in the embodiment of the present disclosure to instruct a person (i.e., the target object) to be controlled to implement scene scheduling. The terminal may be a convenient terminal, such as a mobile phone, a tablet computer, or a touch all-in-one machine, and the convenient terminal synchronously displays a picture displayed by the display screen in the display scene. In a case where the display screen is desired to be adjusted, the operator can directly operate at the convenient terminal.

The server stores the frame image configured for the display screen in advance, and the terminal can acquire the frame image for the display screen during the display screen displaying the frame image, so as to realize synchronous displaying of the picture through a display module of the terminal. Here, the display module may be understood as a screen of the terminal.

The terminal acquires, during displaying the frame image, the current position and the object identifier of the target object in the real scene, and the association relationship between the object identifier and the current position from the server, and displays the object identifier at a specific position of the display module according to the association relationship between the current position and the object identifier, the specific position corresponding to the current position of the target object in the real scene. Then, the terminal generates, in response to the arrangement operation of the operator on the object identifier displayed on the display module, the adjustment information of the target object, corresponding to the object identifier, in the real scene. For example, the operator may drag the object identifier displayed on the display module to an adjusted position, or, define an area, and drag the object identifier, so as to implement an arrangement of the target object in the scene. The adjustment information may include the position adjustment information of the target object. The terminal may transmit the generated adjustment information to the server through a wifi communication mode.

The display screen is configured to display the indication pattern to facilitate the target object to adjust the position thereof as indicated by the indication pattern.

According to the embodiment of the present disclosure, with information interaction between the server, the terminal and the display screen, a modification scheme of the operator on a site can be fed back in real time to the display screen to be displayed, so that the target object can be adjusted quickly, accurate scheduling of a background and the site can be realized during the performance, communication cost between the background and the site is greatly reduced, and the command efficiency of the operator is improved.

Figure 2:
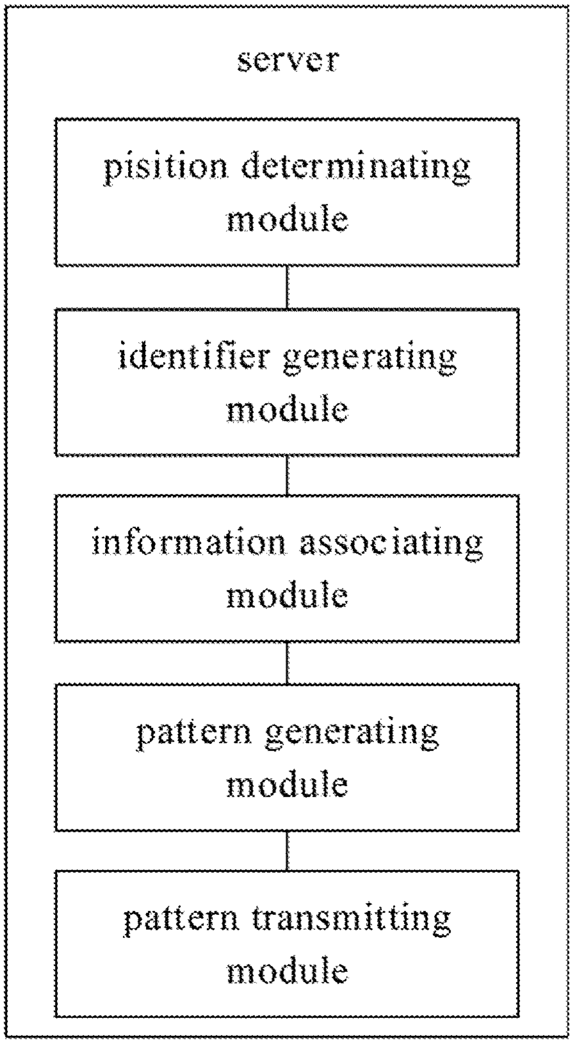
FIG. 2 is a schematic structural diagram of a server according to an embodiment of the present disclosure.

In some implementations, FIG. 2 is a schematic structural diagram of a server according to an embodiment of the present disclosure. As shown in FIG. 2, the server includes a position determining module, an identifier generating module, an information associating module, a pattern generating module, and a pattern transmitting module. The position determinating module is configured to determine the current position of the target object located on the display screen; the identifier generating module is configured to generate the object identifier of the target object; the information associating module is configured to associate the object identifier with the current position of each target object; the pattern generating module is configured to receive the adjustment information, generate the indication pattern according to the current position of the target object and the adjustment information; the pattern transmitting module is configured to transmit the indication pattern to the display screen for display.

The modules in the server will be described in detail below.

Figure 3:
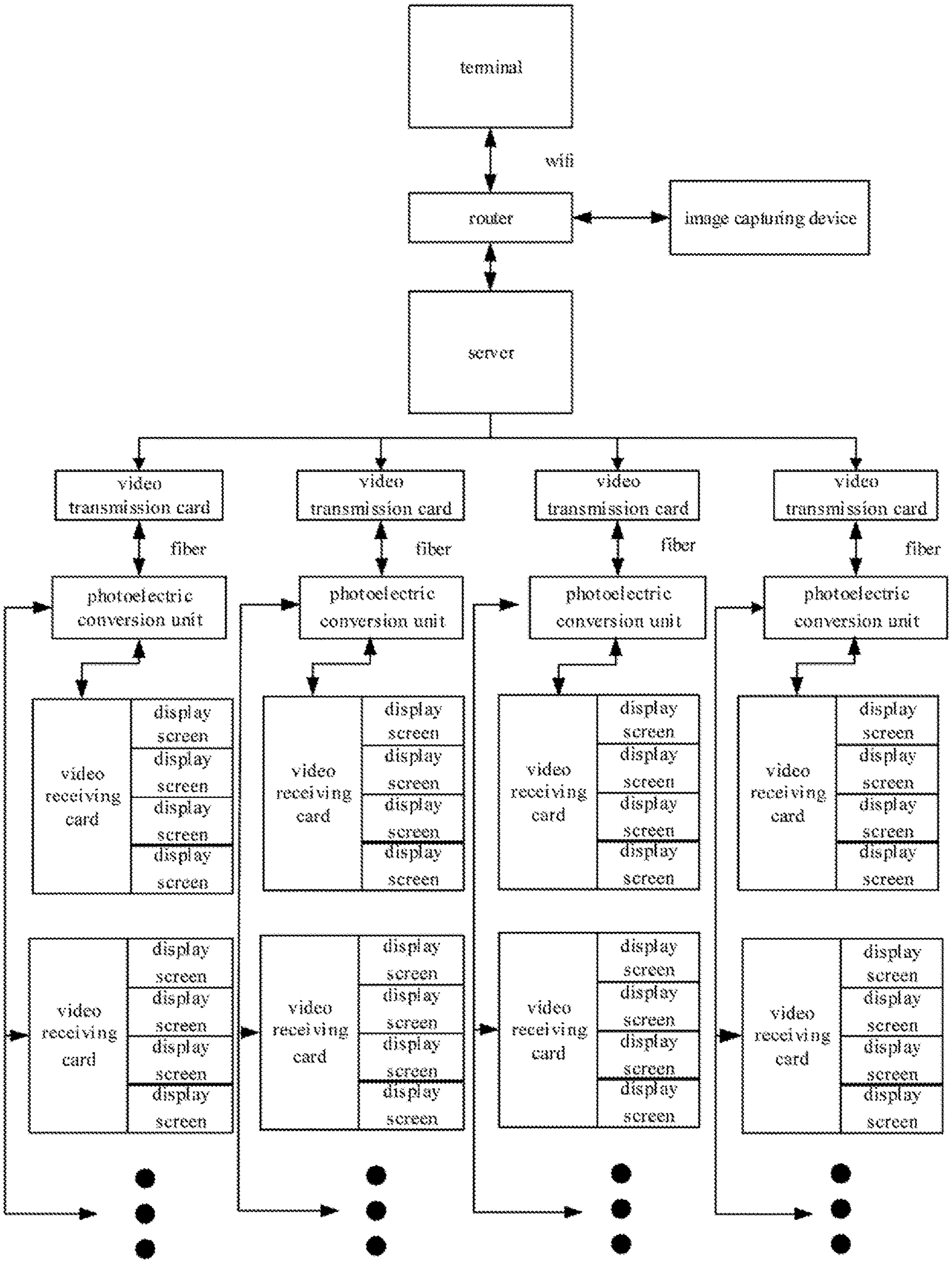
FIG. 3 is a schematic diagram of an interactive system according to an embodiment of the present disclosure.

In some examples, the embodiment of the present disclosure proposes two different ways of determining the current position of the target object in the real scene, in a first example, FIG. 3 is a schematic diagram of an interactive system according to an embodiment of the present disclosure, as shown in FIG. 3, a scene image of the real scene is captured by an image capturing device, and the current position of the target object is determined by using the scene image; in a second example, the current position of the target object is determined by using a positioning sensor carried by the target object.

In the first example, the position determinating module is specifically configured to receive the scene image of the real scene, identify the target object in the scene image, and determine the current position of the target object.

Specifically, the interactive system further includes the image capturing device; the image capturing device is configured to capture the scene image of the real scene and transmit it to the position determinating module in the server.

In the second example, the interactive system further includes a sensor configured for the target object; the sensor is configured to directly transmit the position information of the target object to the server; the position determinating module is specifically configured to take the received position information of the target object as the current position of the target object. Here, the sensor may be a positioning sensor, and can feedback current position information of the target object to the server in real time. The position information is position coordinates in the real scene.

In some examples, the adjustment information includes an updated position of the target object; the pattern generating module is specifically configured to generate a first indication pattern of the current position and generate a second indication pattern from the current position to the updated position according to the current position and the updated position of the target object. Here, the first indication pattern is only located at the current position, and is used for prompting the target object located at the current position to adjust. The first indication pattern may be randomly selected by the pattern generating module from a pattern library, or may be selected by a user from the pattern library. A shape of the first indication pattern may be triangle, square, circle, pentagram or the like, and a color of the first indication pattern may be white, red, green, yellow, blue or the like; alternatively, the first indication pattern may be a dynamic special effect pattern, for example, a highlight flashing, a breathing light, a firework blooming, or the like. The second indication pattern may be a static arrow pattern indicating an indication from the current position to the updated position, or may be a dynamic arrow moving pattern, for example, a moving track pattern indicating that an arrow moves from the current position to the updated position, starting from the display of the first indication pattern at the current position of the display screen, for instructing the target object to follow the travel path of the arrow to reach the destination. The display screen is configured to display the first indication pattern at the current location and the second indication pattern between the current position and the updated position.

In some examples, the first indication pattern and the second indication pattern may be patterns different from a picture currently displayed by the display screen. Based on this, the pattern generating module is specifically configured to: determine a picture corresponding to another area located around the current position and an area picture located between the current position and the updated position according to the frame image; generate the first indication pattern positioned at the current position according to the picture corresponding to the another area and the current position; and generate the second indication pattern from the current position to the updated position according to the area picture, the current position and the updated position of the target object.

The first indication pattern may be automatically screened from the pattern library by the pattern generating module. In particular, in order to distinguish the first indication pattern from the frame image currently displayed by the display screen more obviously, before generating the first indication pattern, the pattern generating module identifies a picture corresponding to the another area around the current position, and select, from the pattern library, the first indication pattern which is more obviously different from the picture in color and shape. For example, if the frame image currently displayed by the display screen is a blue ocean, the first indication pattern to be generated is preferably desired to be a graphic with clear edges and corners, such as a five-pointed star, and to have a color of yellow or orange that is very different from a color of the blue ocean. For the second indication pattern, the area picture between the current position and the updated position is identified, and the second indication pattern which has a color very different from a color of the area picture is selected from the pattern library. For example, if a color of an area around the current position is blue, a color of an area around the updated position is yellow, and a red area exists between the current position and the updated position, the color of the second indication pattern may be a color different from blue, yellow, and red mentioned above, and may be green. Specifically, on the premise that colors have been distinguished from each other, the way of generating the second indication pattern is the same as the way of generating the second indication pattern in the above examples (i.e., generating a static indication arrow or a dynamic movement arrow), and repeated descriptions are omitted.

In some examples, a third indication pattern may be displayed only at the current position and a fourth indication pattern may be displayed at the updated position.

Specifically, the adjustment information includes the updated position of the target object; the pattern generating module is specifically configured to: generate the third indication pattern located at the current position according to the current position of the target object; and generate the fourth indication pattern located at the updated position according to the updated position. Here, the third indication pattern may be a pattern the same as the first indication pattern, for example, may be a pattern having a shape of triangle, square, circle, or pentagram, and a color of white, red, green, yellow, or blue; alternatively, the third indication pattern may be a dynamic special effect pattern, such as a highlight flashing, a breathing light, a firework blooming, or the like. The fourth indication pattern may be a pattern having a shape of triangle, square, circle or pentagram, and a color of white, red, green, yellow or blue; alternatively, the fourth indication pattern may alternatively be a dynamic special effect pattern, such as a highlight flashing, a breathing light, a firework blooming, or the like. For example, in order to determine an adjustment position for the target object in the real scene, the third indication pattern and the fourth indication pattern of the target object are the same. The display screen is configured to display the third indication pattern at the current position and the fourth indication pattern at the updated position.

The third indication pattern and the fourth indication pattern are both patterns that are obviously different from the picture displayed therearound, and for the specific implementation process, reference is made to the automatic configuration process of the above example, and repeated descriptions are omitted.

In some examples, as shown in FIG. 3, the pattern transmitting module includes a video transmission card, a photoelectric conversion unit, and a video receiving card. The video transmission card is configured to transmit the indication pattern (e.g., the first indication pattern and the second indication pattern described above; or the third indication pattern and the fourth indication pattern described above) to the photoelectric conversion unit through an optical fiber. The photoelectric conversion unit is configured to convert the indication pattern into an electric signal and transmit the electric signal to the video receiving card, and the video receiving card is configured to convert the received electric signal into a video signal and transmit the video signal to the display screen for display.

In some examples, the pattern transmitting module is further configured to transmit the frame image to the display screen. Specifically, as shown in FIG. 3, the video transmitting card is configured to transmit the frame image to the photoelectric conversion unit through the optical fiber. The photoelectric conversion unit is configured to convert the frame image into an electric signal and transmit the electric signal to the video receiving card, and the video receiving card is configured to convert the received electric signal into a video signal and transmit the video signal to the display screen for display.

The display screen is configured to display the frame image, and after receiving the indication pattern, display the indication pattern by superimposing the indication pattern on the frame image. Alternatively, the display screen is configured to display the frame image, and after receiving the indication pattern, replace the frame image at the current position with the first indication pattern, and display the second indication pattern by superimposing the second indication pattern on the frame image.

Here, the superimposing (i.e., display by superimposing) means that an image layer is added on the currently displayed frame image to exclusively display the indication pattern. Replacing the frame image here means that, for the image layer where the frame image is located, the image located at the current position of the image layer is replaced with the first indication pattern. For the second indication pattern, since the second indication pattern spans a relatively long path, it is displayed by superimposing it on the displayed frame image, rather than replacing any image with the second indication pattern. Certainly, the replacement technology for the first indication pattern may also be used to realize the replacement of the corresponding pattern with the second indication pattern, and thus the embodiment of the present disclosure may be set as desired and the present disclosure is not limited thereto.

Similarly, the third indication pattern and the fourth indication pattern may also be displayed on the display screen based on the implementation process described above, and repeated descriptions are omitted.

In some examples, after the target object is completely scheduled once, the adjustment information generated by the terminal may be saved in the server, so as to facilitate to review the scheduling scheme of the target object subsequently. Specifically, the interactive system further includes a storage module; the terminal is further configured to transmit, in response to a scheme storage operation, the position of each object identifier currently displayed to the storage module; the storage module is configured to store the position of each object identifier for calling back the scheduling scheme of the target object corresponding to the object identifier.

In some implementations, in order to solve the problem that the stage effect modification period is relatively long in the stage scene, the terminal provided by the embodiment of the present disclosure further includes a replacement module, which is configured to synchronously display a modification scheme for the frame image on the display screen, with such real-time modification and visual display, the workload of repeated modifications due to the fact that the actual effect is not in line with the expectation can be reduced, the working efficiency is improved, and the modification cost is reduced.

Specifically, the display module is configured to display, in response to the operation of replacing the frame image, the frame image and a preset material library file; the material library file includes at least one material video for replacing the frame image. The replacing module is configured to select, in response to a selection of a starting time point and an ending time point and an operation of selecting the material video, a target material video section from the material video to replace the frame image between the starting time point and the ending time point; the duration of the target material video section is equal to a time duration from the starting time point to the ending time point.

By taking the stage scene as an example, a user stores related materials such as videos, pictures, audios and texts in the terminal in advance, in a case where the content currently displayed by the display screen is to be modified, the operator may select a stage modification mode displayed in the display module, in this case, the display module displays a display picture (namely, the frame image displayed by the display screen) of the current stage and the material library file, the material library file including multiple material videos, the operator may select a time duration of the frame image to be modified, namely, the starting time point and the ending time point, from a progress bar indicating the frame image currently displayed, and then, the material video for replacement is dragged into the current time duration. The replacement module extracts a target material video section, having a time duration the same as the time duration of the frame image to be modified, from the received material video, the time duration of the frame image to be modified is from the starting time point to the ending time point. Specifically, the video section may be randomly extracted from the material video, or the material video section with the time duration may be extracted starting from the first frame of the material video. The replacement here means that the image layer where the frame image in the corresponding time duration is located is replaced with the material video section.

In some examples, if only a partial region of the frame image is to be modified, the partial region to be modified may be manually selected and then the specific content of the selected partial region may be adjusted. Specifically, the terminal further includes a selecting module; the selecting module includes a first adjusting unit and an enlarging unit. The first adjusting unit is configured to adjust the partial region to be a regular region in response to an operation of selecting the partial region of the frame image. It should be noted that, if the operator manually draws a region to be modified on the screen of the terminal, the drawn line is not necessarily regular, in this case, the first adjusting unit may perform a rule adjustment according to the region selected by the operator manually drawing the line, to obtain a regular region, for example, a regular region such as a rectangle region or a circle region. The enlarging unit is configured to enlarge a sub-image located in the regular region. Specifically, the enlarging unit may proportionally enlarge the sub-image of the regular region on the display module according to a proportion relationship between a region of the frame image displayed by the display module and the regular region, so that the sub-image occupies the entire image display area of the display module as much as possible, which is convenient for an operator to view the sub-image.

The replacing module is specifically configured to select, in response to a selection of the starting time point and the ending time point and an operation of selecting the material video, a target material video section located at a corresponding position in the regular region from the material video, to replace the sub-image, located in the regular region and between the starting time point and the ending time point, of each frame image; the resolution of the material image in the target material video section is the same as the resolution of the frame image.

The same as replacing the whole frame image displayed by the display module in the above embodiment, the sub-image in the regular region in the frame image may be replaced by using the same technique, and the repeated process is not described here again.

In some examples, after determining the regular region, the operator may further adjust the regular region, for example, adjust a size of a drawn frame, etc., to determine the target region to be finally selected. Specifically, the selecting module further includes a second adjusting unit; the second adjusting unit is configured to determine the target region in response to an adjustment on the regular region. The enlarging unit is configured to enlarge the sub-image located in the target region. Here, the manner in which the enlarging unit enlarges the sub-image in the target region is the same as that of enlarging the sub-image in the regular region described in the above example, and the repeated description is omitted.

The replacing module is specifically configured to select, in response to a selection of the starting time point and the ending time point and an operation of selecting the material video, a target material video section located at a corresponding position of the target region from the material video, to replace the sub-image, located in the target region and between the starting time point and the ending time point, of each frame image.

The same as replacing the whole frame image displayed by the display module in the above example, the sub-image in the target region in the frame image may be replaced by using the same technique, and the repeated process is not described here again.

The replacement here means that the material sub-image (material video section) is superimposed on the original image layer to be displayed.

In some examples, the terminal further includes a boundary optimization module. The boundary optimization module is configured to determine, after the replacing module completes its operation, in response to an optimization operation on a boundary of the replaced image, an image, with the optimized boundary, to be presented. The display screen is configured to display the image to be presented.

Here, in a case where only a partial region of the frame image is to be modified, after the image of the partial region is modified, there is a significant change in picture between the sub-image/image corresponding to the partial region and the original frame image of the region around the partial region, and therefore, the terminal performs optimization processing on the boundary between the replaced sub-image of the partial region and the original frame image by default, so that the boundary is excessively smoothed. However, for special situations, the operator may alternatively choose to perform an edge sharpening process on the boundary, i.e., to make the difference between the images on both sides of the boundary obvious. Therefore, the optimization operation may include one or more of color smoothing, boundary sharpening or image blurring, which may be selected according to an actual scene, and is not limited in the embodiment of the present disclosure.

In some implementations, a stage picture may be displayed incorrectly, and in order to improve an overall coordination of the stage picture, the terminal further includes a manual adjustment module capable of supporting to manually draw on the picture. The manual adjustment module includes an editing unit and a display unit. The editing unit is configured to generate an edited content in response to an editing operation on the frame image. The display unit is configured to display the edited content by superimposing it on the frame image. The display screen is configured to display the frame image on which the edited content is superimposed.

Here, the editing operation may be understood as an operation of the operator drawing a pattern on the screen of the terminal to compensate for incompleteness or overall harmony of the picture displayed by the display screen. The display screen is configured to display the frame image on which the edited content is superimposed.

In some examples, the manual adjustment module further includes an effect adjusting unit. The effect adjusting unit is configured to adjust a playback effect of the edited content. The display unit is configured to display the edited content and the playback effect by superimposing them on the frame image. The display screen is configured to display the frame image on which the edited content and the adjusted playback effect are superimposed.

The display time and the playback effect of the manually drawn picture may be adjusted, for example, the manually drawn picture is played circularly according to a certain time duration, and the playback effect is in a fade-in and fade-out mode, a gradient mode, or the like. The manual adjustment module transmits the drawn result to the server for rendering, and then the server transmits the rendered effect to the display screen to be superposed on the frame image for displaying.

In some implementations, the terminal includes a position adjustment module configured to adjust a position of the display screen in the display scene, for example, by controlling a lift platform in real-time, and the server may save a timestamp of such modification/adjustment.

In some examples, after the stage effect is completely modified once, the modification information generated by the terminal may be saved in the server, so as to be used for conveniently viewing the modification scheme of the stage effect subsequently. Specifically, the interactive system further includes a storage module; the terminal is further configured to transmit, in response to an operation of storing the modification scheme, the position of each object identifier currently displayed to the storage module; the storage module is further configured to store modification information of the stage (i.e., the replacement of the material video, the manually drawn picture, stage special effects, the adjustment on the lift platform, etc. in the above examples) in the form of voices or texts, for recalling historical modification records of the stage.

The interactive system provided by the embodiment of the present disclosure can be applied to the scene of performance rehearsal, and can assist to quickly adjust the position of the target object in the real scene by the operator arranging each object identifier of the target object on the terminal, improving the command efficiency of the operator. In addition, in an event of error or dislocation of the target object in the performance process, the terminal provided by the embodiment of the present disclosure can support the modification of the stage effect, can realize the rapid modification of the background picture displayed by the display screen, and can compensate for the incompleteness of the stage effect. Alternatively, the operator may use the manual adjustment module to compensate for the stage effect, for example, in a case of a scheme for performing in coordination with a track of an actor, if the server does not receive the data about the track of the actor, the server initiates a manual adjustment request to the manual adjustment module of the terminal, and the manual adjustment module superimposes, in response to the drawing operation of the operator on the frame image, the edited content and/or the adjusted playback effect on the frame image to display.

Figure 4:
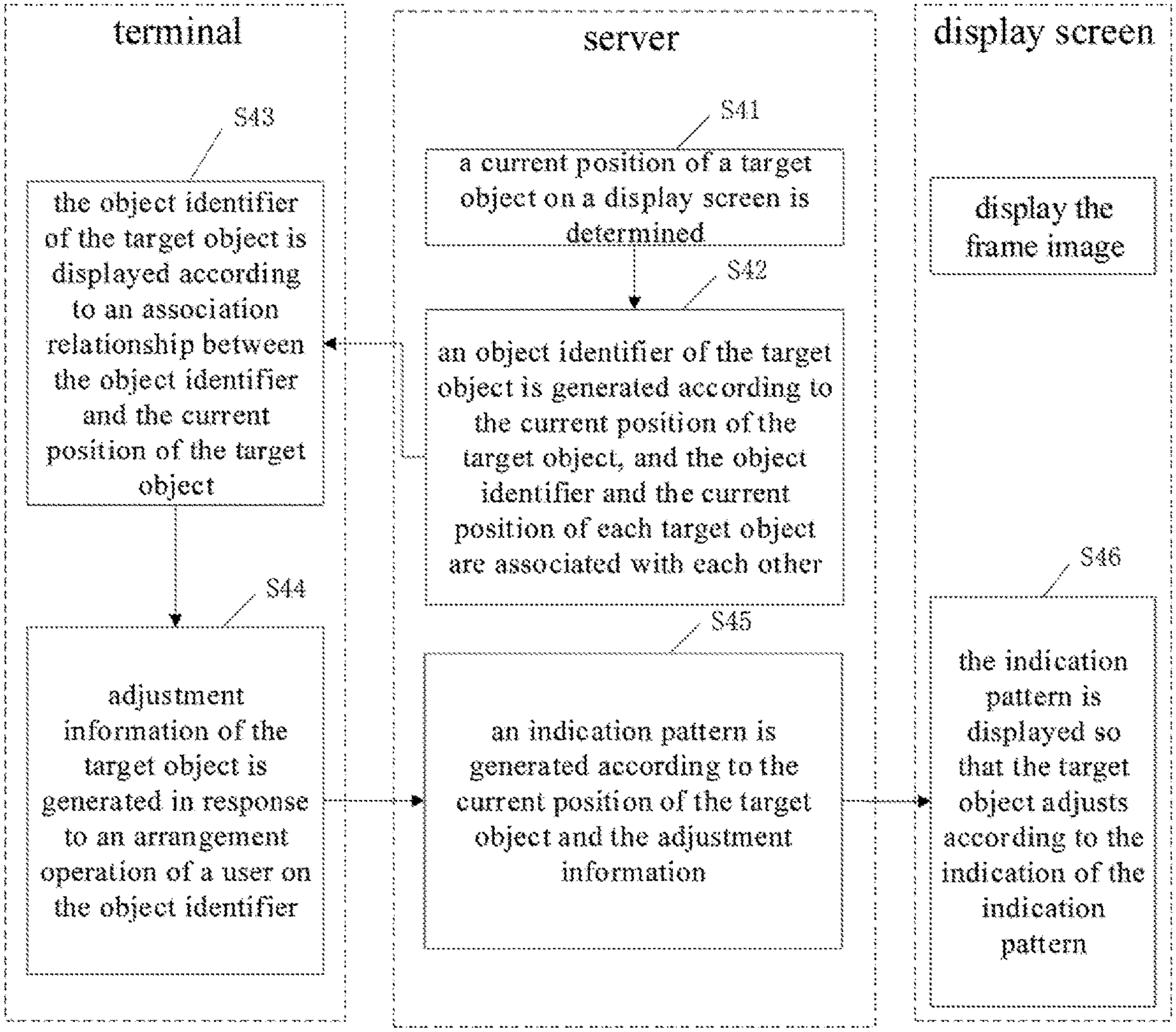
FIG. 4 is a schematic diagram of an interaction method according to an embodiment of the present disclosure.

In a second aspect, an embodiment of the present disclosure further provides an interactive method, and FIG. 4 is a schematic diagram of an interaction method provided in the embodiment of the present disclosure, as shown in FIG. 4, the interactive method includes following steps S41 to S46.

At step S41, a current position of a target object on a display screen is determined.

At step S42, an object identifier of the target object is generated according to the current position of the target object, and the object identifier and the current position of the target object are associated with each other.

Here, the steps S41 and S42 may be performed by the server in the above examples, and detailed description thereof is omitted.

At step S43, the object identifier of the target object is displayed according to an association relationship between the object identifier and the current position of the target object.

At step S44, adjustment information of the target object is generated in response to an arrangement operation of a user on the object identifier.

Here, the steps S43 and S44 may be performed by the terminal in the above examples, and detailed description thereof is omitted.

At step S45, an indication pattern is generated according to the current position of the target object and the adjustment information.

Here, the step S45 may be performed by the server in the above examples, and detail description thereof is omitted.

At step S46, the indication pattern is displayed so that the target object adjusts according to an indication of the indication pattern.

Here, the step S46 may be performed by the display screen in the above examples, and detailed description thereof is omitted.

In the embodiment of the present disclosure, the modification scheme of the operator on the site can be feedback to the display screen in real time for display, so as to quickly adjust the target object, and accurate scheduling of the background and the site can be realized in the performance process, thereby greatly reducing the communication cost between the backstage and the site and improving the command efficiency of the operator.

It will be understood that the above embodiments are merely exemplary embodiments employed to illustrate the principles of the present disclosure, and the present disclosure is not limited thereto. It will be apparent to those skilled in the art that various changes and modifications may be made without departing from the spirit and scope of the present disclosure, and these changes and modifications are to be considered within the scope of the present disclosure.

What is claimed is:

1. An interactive system, comprising a terminal, a display screen and a server, the terminal and the display screen each being communicatively connected with the server, wherein the server is configured to determine a current position of a target object on the display screen; generate an object identifier of the target object according to the current position of the target object, and associate the object identifier of the target object with the current position of the target object; receive adjustment information of the target object from the terminal, generate an indication pattern according to the current position and the adjustment information of the target object, and transmit the indication pattern to the display screen for display;

the terminal is configured to display a frame image configured in advance for the display screen, and display the object identifier of the target object according to an association relationship between the object identifier and the current position of the target object; receive an arrangement operation of a user on the object identifier to generate adjustment information of the target object, and transmit the adjustment information of the target object to the server; and the display screen is configured to display the indication pattern to instruct the target object to adjust according to an indication of the indication pattern, and wherein the interactive system further comprises an image capturing device configured to capture a scene image of a real scene and transmit the scene image to the server.

2. The interactive system of claim 1, wherein the server comprises a position determinating module, an identifier generating module, an information associating module, a pattern generating module, and a pattern transmitting module, wherein the position determinating module is configured to determine the current position of the target object on the display screen;

the identifier generating module is configured to generate the object identifier of the target object;

the information associating module is configured to associate the object identifier and the current position of each target object;

the pattern generating module is configured to receive the adjustment information, generate the indication pattern according to the current position and the adjustment information of the target object, and transmit the indication pattern to the display screen for display; and the pattern transmitting module is configured to transmit the indication pattern to the display screen for display.

3. The interactive system of claim 2, wherein the position determinating module is further configured to receive a scene image of a real scene, identify the target object in the scene image, and determine the current position of the target object.

4. The interactive system of claim 2, further comprising: a sensor configured for the target object, the sensor being configured to transmit position information of the target object to the server, wherein the position determining module is further configured to take received position information of the target object as the current position of the target object.

5. The interactive system of claim 2, wherein the adjustment information comprises an updated position of the target object; the pattern generating module is further configured to generate, according to the current position and the updated position of the target object, a first indication pattern located at the current position and a second indication pattern from the current position to the updated position of the target object; and the display screen is further configured to display the first indication pattern at the current position and display the second indication pattern between the current position and the updated position of the target object.

6. The interactive system of claim 5, wherein the pattern generating module is further configured to: determine, from the frame image, a picture corresponding to another area around the current position of the target object and an area picture between the current position and the updated position of the target object; generate the first indication pattern located at the current position of the target object according to the picture corresponding to the another area around the current position of the target object; and generate the second indication pattern from the current position of the target object to the updated position of the target object according to the area picture, the current position and the updated position of the target object.

7. The interactive system of claim 5, wherein the pattern transmitting module is further configured to transmit the frame image to the display screen;

the display screen is further configured to display the frame image and to display, after receiving the indication pattern, the indication pattern by superimposing the indication pattern on the frame image; or replacing the frame image at the current position of the target object with the first indication pattern, and display the second indication pattern by superimposing the second indication pattern on the frame image.

8. The interactive system of claim 2, wherein the adjustment information comprises an updated position of the target object, and the pattern generating module is further configured to: generate a third indication pattern located at the current position of the target object according to the current position of the target object; and generate a fourth indication pattern located at the updated position according to the updated position of the target object; and the display screen is further configured to display the third indication pattern at the current position and display the fourth indication pattern at the updated position.

9. The interactive system of claim 1, further comprising: a storage module, wherein the terminal is further configured to transmit, in response to a scheme storage operation, a position of each object identifier currently displayed to the storage module, and the storage module is configured to store the position of each object identifier.

10. The interactive system of claim 1, wherein the terminal further comprises a display module and a replacement module; wherein the display module is configured to display, in response to a replacement operation on the frame image, the frame image and a preset material library file; the material library file comprises at least one material video for replacing the frame image;

the replacement module is configured to select, in response to a selection of a starting time point and an ending time point and a selection operation on the material video, a target material video section from the material video, to replace the frame image between the starting time point and the ending time point, a time duration of the target material video section is equal to a time duration from the starting time point to the ending time point.

11. The interactive system of claim 10, wherein the terminal further comprises a selecting module, the selecting module comprising a first adjusting unit and an enlarging unit;

the first adjusting unit is configured to adjust a partial region of the frame image into a regular region in response to an operation of selecting the partial region;

the enlarging unit is configured to enlarge a sub-image located in the regular region;

the replacing module is further configured to: select, in response to the selection of the starting time point and the ending time point and the selection operation on the material video, the target material video section located at a corresponding position in the regular region from the material video to replace the sub-image, located in the regular region and between the starting time point and the ending time point, of each frame image, a resolution of a material image in the target material video being the same as a resolution of the frame image.

12. The interactive system of claim 11, wherein the selecting module further comprises a second adjusting unit;

the second adjusting unit is configured to determine a target region in response to an adjustment on the regular region;

the enlarging unit is further configured to enlarge a sub-image located in the target region;

the replacing module is further configured to: select, in response to the selection of the starting time point and the ending time point and the selection operation on the material video, a target material video section located at a corresponding position in the target region from the material video to replace the sub-image, located in the target area and between the starting time point and the ending time point, of each frame image.

13. The interactive system of claim 11, wherein the terminal further comprises a boundary optimization module;

the boundary optimization module is configured to determine, after the replacing module completes an operation, in response to an optimization operation on a boundary of the replaced sub-image, an image subjected to the boundary optimization to be presented, the optimization operation comprising one or more of color smoothing, boundary sharpening or image blurring;

the display screen is further configured to display the image to be presented.

14. The interactive system of claim 1, wherein the terminal further comprises a manual adjustment module, the manual adjusting module comprising an editing unit and a display unit;

the editing unit is configured to generate an edited content in response to an editing operation on the frame image;

the display unit is further configured to display the edited content by superimposing the edited content on the frame image;

the display screen is further configured to display the frame image on which the edited content is superimposed.

15. The interactive system of claim 14, wherein the manual adjustment module further comprises an effect adjusting unit;

the effect adjusting unit is configured to adjust a playback effect of the edited content;

the display unit is further configured to display the edited content and the playback effect by superimposing them on the frame picture; and the display screen is configured to display the frame image on which the edited content and the adjusted playback effect are superimposed.

16. The interactive system of claim 6, wherein the pattern transmitting module is further configured to transmit the frame image to the display screen;

the display screen is further configured to display the frame image and to display, after receiving the indication pattern, the indication pattern by superimposing the indication pattern on the frame image; or replacing the frame image at the current position of the target object with the first indication pattern, and display the second indication pattern by superimposing the second indication pattern on the frame image.

17. The interactive system of claim 12, wherein the terminal further comprises a boundary optimization module;

the boundary optimization module is configured to determine, after the replacing module completes an operation, in response to an optimization operation on a boundary of the replaced sub-image, an image subjected to the boundary optimization to be presented, the optimization operation comprising one or more of color smoothing, boundary sharpening or image blurring;

the display screen is further configured to display the image to be presented.

* * * * *